United States Patent [19]

Tanaka et al.

[11] Patent Number: 4,929,221
[45] Date of Patent: May 29, 1990

[54] POWER TRANSMISSION TOOTHED BELT AND DRIVE

[75] Inventors: Hiroyuki Tanaka; Kuniharu Uto; Kazumi Kawai; Tsuneo Shaura; Motonobu Yasuhuku, all of Kobe, Japan

[73] Assignee: Mitsuboshi Belting Ltd., Kobe, Japan

[21] Appl. No.: 280,589

[22] Filed: Dec. 5, 1988

[30] Foreign Application Priority Data

Nov. 12, 1987 [JP] Japan .................................. 62-286842
Dec. 29, 1987 [JP] Japan .................................. 62-335908

[51] Int. Cl.⁵ ............................................... F16G 1/28
[52] U.S. Cl. .................................................... 474/205
[58] Field of Search .............................. 474/203–205, 474/153, 265

[56] References Cited

U.S. PATENT DOCUMENTS

| 4,337,056 | 6/1982 | Bruns | 474/205 X |
| 4,403,979 | 9/1983 | Wujick | 474/205 X |
| 4,515,577 | 5/1985 | Cathey et al. | 474/204 |
| 4,604,080 | 8/1986 | Mizuno | 474/205 X |
| 4,679,999 | 7/1987 | Wetzel | 474/205 X |

Primary Examiner—Thuy M. Bui
Attorney, Agent, or Firm—Wood, Phillips, Mason, Recktenwald & VanSanten

[57] ABSTRACT

A power transmission toothed belt drive having a belt tooth power transmission surface defined by an arc having a radius centered on a point approximately one-half the belt tooth pitch from the centerline of the tooth. The pulley groove has a sidewall surface which confronts the power transmission surface of the belt tooth centered on the same point when the belt tooth is fully meshed with the pulley groove in the operation of the drive. A relatively small clearance with the pulley is provided adjacent the belt tooth root and a relatively large clearance is provided between the pulley groove inner surface and the tip surface of the belt tooth. In one form of the invention, both the power transmission surface and tip surface of the belt tooth are defined by a single radius and the confronting pulley groove sidewall surface and inner surface confronting the belt tooth power transmission surface and tip surface have a constant clearance therewith and are defined by continuous circular arcs.

21 Claims, 2 Drawing Sheets

POWER TRANSMISSION TOOTHED BELT AND DRIVE

TECHNICAL FIELD

This invention relates to power transmission belt drives and in particular to power transmission toothed belt drives.

BACKGROUND ART

Toothed belt drives are advantageously adapted for providing positive power transmission free of slip, with relatively low noise. A common form of such toothed belt drive is one wherein the belt tooth has a trapezoidal cross section and the pulley groove is complementary thereto. A number of belt drives have been developed utilizing rounded teeth.

In the conventional toothed belt drive system, the belt tooth has a maximum backlash at the root portion thereof. While such a belt smoothly engages the pulley, such belts tend to wear rapidly and because of the possible movement of the belt relative to the pulley at start-up, the pulley tends to scrape the surface of the belt tooth, further aggravating the wear problem.

One solution to this problem has been to apply a substantial tension to the belt so as to minimize the movement of the belt relative to the pulley at start-up. It has been found, however, that the application of high tension to the belt causes the belt to lengthen and have shortened useful life due to early breakage thereof.

Another attempted solution to the problem has been to provide a toothed belt drive wherein there is a constant clearance between the belt tooth and the pulley groove sidewall from the belt tooth root to the belt tooth tip. This attempted solution has not proven fully satisfactory because of the interference with the pulley by the belt teeth, requiring the belt tension to be reduced. With reduced belt tension, the belt tends to jump from the pulley grooves under low loads.

In one form of prior art belt, the power transmission surface portion of the belt tooth flank is defined by an arc centered on the belt pitch line. Such design, however, causes the teeth to be relatively small so as to reduce the force transmission capabilities and thereby aggravating the belt jumping problem.

Another attempted solution has been to locate the center of the power transmission surface arc on the belt land line. This results, however, in the inclination of the belt tooth power transmission surface to become relatively large, thereby increasing interference of the belt with the pulley and requiring an increased backlash at the belt tooth root, thereby again causing the problem of movement of the belt relative to the pulley during start-up or upon reverse rotation of the drive.

The various problems cause a reduction in the accuracy in the positive driving by such toothed belts and is a vexatious problem which has not been fully solved, notwithstanding the longstanding need for such a solution.

DISCLOSURE OF INVENTION

The present invention comprehends an improved power transmission toothed belt drive which provides a long, troublefree life of the belt over a wide range of loads and with improved high accuracy in the positioning characteristics of the drive.

More specifically, the invention comprehends the provision of a power transmission toothed belt including a body defining a longitudinal pitch line and an inner land line, and a plurality of teeth projecting inwardly from the body, each tooth defining a centerline and being symmetrical about the centerline, each side of the tooth being defined by a convex radially outer root surface, an inner tip surface, and an intermediate power transmission surface, the power transmission surface defining a circular arc having a radius centered at a point spaced from the centerline approximately one-half the pitch of the teeth, and the radius having a length less than the pitch of the teeth.

In the illustrated embodiment, the power transmission surface extends inwardly from a junction with an outer end of the root surface, the junction being spaced inwardly from the land line approximately one-fourth the height of the belt tooth from the land line, or less.

In the illustrated embodiment, the tip surface extends inwardly from a junction with an outer end of the power transmission surface, the junction being spaced inwardly from the land line approximately two-thirds the height of the belt tooth from the land line, or less.

The invention further comprehends the provision of such a belt wherein the power transmission surface extends inwardly from a first junction with an outer end of the root surface, the tip surface extends inwardly from a second junction with an outer end of the power transmission surface, a line extending through said first and second junctions intersecting the tooth centerline at an angle in the range of approximately 9° to 18°.

In a preferred embodiment, the line extending through the junctions intersects the tooth centerline at an angle in the range of approximately 12° to 14°.

The invention comprehends that the power transmission surfaces at the opposite sides of the belt tooth define reversely similar circular arcs having their respective radii centered at points spaced apart a distance in the range of approximately 0.95 to 1.05 the pitch of the teeth.

The power transmission surface arc radii have a length in the range of approximately 80% to 85% of the spacing between the points.

The invention further comprehends the use of such a power transmission toothed belt in a drive including a pulley having a plurality of circumferentially radially outwardly opening grooves, each groove being symmetrical about a radial centerline, each half of each groove having a convex outer surface defined by an arc of a circle extending inwardly from a face line defined by the radially outer distal face of a land between successive pulley grooves, a concave sidewall surface extending inwardly from the outer surface and being defined by a circular arc having a radius centered at a point spaced from the centerline approximately one-half the pitch of the grooves, and a concave inner surface.

In the illustrated embodiment, the point at which the sidewall arc radius is centered is coincident with the point at which the power transmitting surface of the belt is centered when the belt tooth is fully meshed with the pulley in the groove.

In the illustrated embodiment, the outer surface of the pulley groove is defined by a circular arc having a radius centered in the pulley.

The inner surface of the pulley groove defines a circular arc having a radius centered at a point in the pulley groove, the inner pulley groove surface radius being shorter than the belt tooth tip surface radius.

The pulley groove further defines a convex radially inner bottom surface and, in the illustrated embodiment, the belt tooth has a length greater than the depth of the pulley groove, whereby compression of the belt tooth is effected when the belt tooth is fully meshed with the pulley in the operation of the drive system.

In the illustrated embodiment, the belt root surface defines a circular arc having a radius centered at a point inwardly of the land line, and the pulley outer surface defines a circular arc having a radius centered at a point in the pulley, the pulley groove outer surface radius being longer than the belt root surface radius.

In the illustrated embodiment, the belt tooth surfaces and pulley groove surfaces are constructed such that a clearance is provided between the confronting surfaces, the clearance between the pulley groove outer surface and the belt tooth root surface being smaller than the clearance between the pulley groove sidewall surface and the belt tooth power transmission surface, and the clearance between the pulley groove sidewall surface and the belt tooth power transmission surface being smaller than the clearance between the pulley groove inner surface and the belt tooth tip surface.

In a modified form of power transmission toothed belt drive system embodying the invention, the inner tip surface of the belt tooth is defined by an arc having a radius centered on the same point as that on which the power transmission surface is centered.

A relatively small diameter rounded surface extends inwardly from the tip surface.

The pulley groove is caused to have a similar construction in that the sidewall surface and inner surface of the pulley groove are respectively defined by arcs having radii centered on the same point and, in the illustrated embodiment, the pulley groove surface center point is coincident with the belt tooth surface center point when the belt tooth is fully meshed with the pulley groove.

Thus, in the modified form, a constant clearance is had between the belt tooth power transmission and tip surfaces and the pulley groove sidewall and inner surfaces, respectively.

In the modified embodiment, the flank surfaces of the tooth and pulley groove extend as a single continuous circular arc substantially to the distal end of the belt tooth and bottom of the pulley groove.

The improved construction of the power transmission belt toothed drive of the present invention permits the belt to be relative large and strong for transmitting relatively high loads. An improved constant clearance between the power transmission surface and confronting pulley groove sidewall surface, and the relatively small angle of the extent of the power transmission surface relative to the centerline of the belt tooth provides improved positive power transmission with effectively minimized tendency for jumping of the belt from the pulley in the operation of the drive.

The provision of a small clearance between the pulley root surface and the outer surface of the pulley groove sidewall effectively minimizes movement of the belt tooth relative to the pulley at start-up. The provision of a relatively large clearance between the tip surface of the belt tooth and the inner surface of the pulley groove minimizes interference between the belt tooth and pulley and provides for facilitated engagement and disengagement of the belt tooth relative to the pulley in the operation of the drive.

The power transmission toothed belt drive of the present invention is extremely simple and economical of construction while yet providing the highly desirable features discussed above.

BRIEF DISCUSSION OF THE DRAWING

Other features and advantages of the invention will be apparent from the following description taken in connection with the accompanying drawing wherein.

BEST MODE FOR CARRYING OUT THE INVENTION

Figure 3:
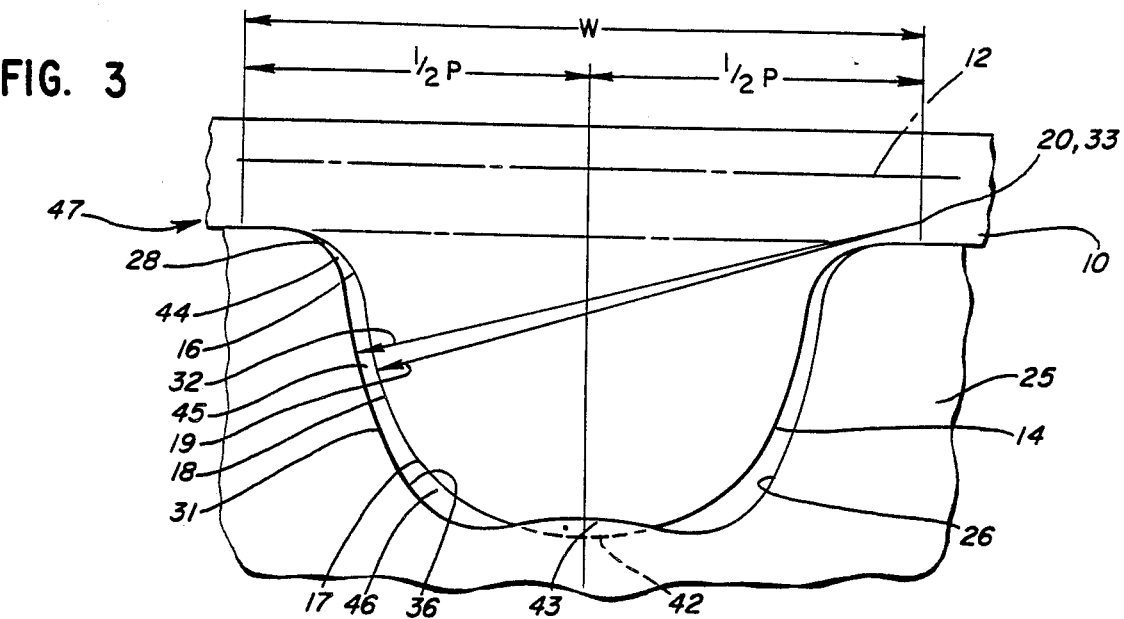
FIG. 3 is a fragmentary side elevation of the belt and pulley in meshed association.
Figure 1:
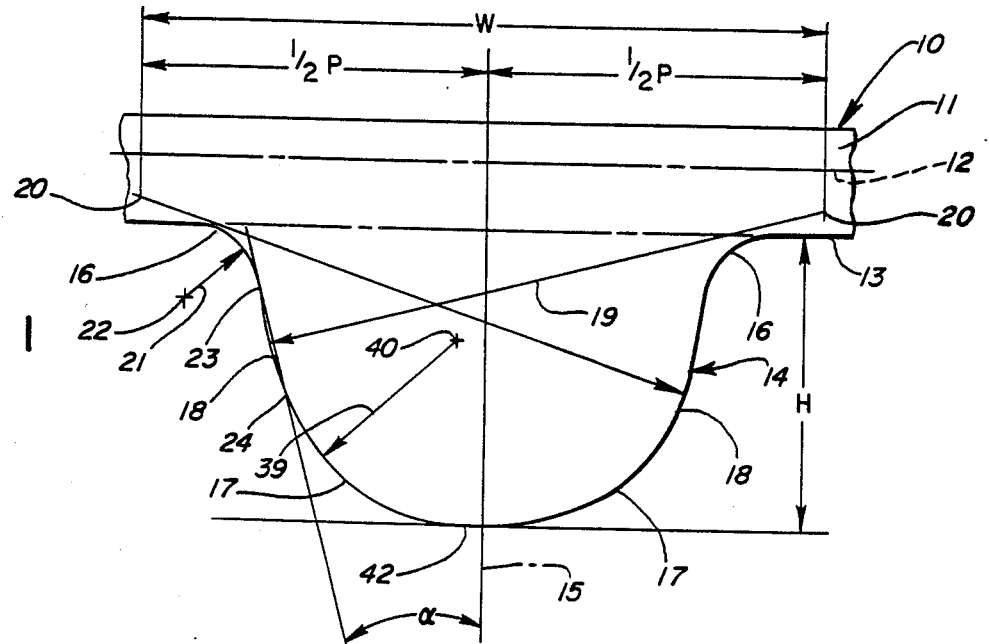
FIG. 1 is a fragmentary side elevation of a toothed belt embodying the invention.
Figure 2:
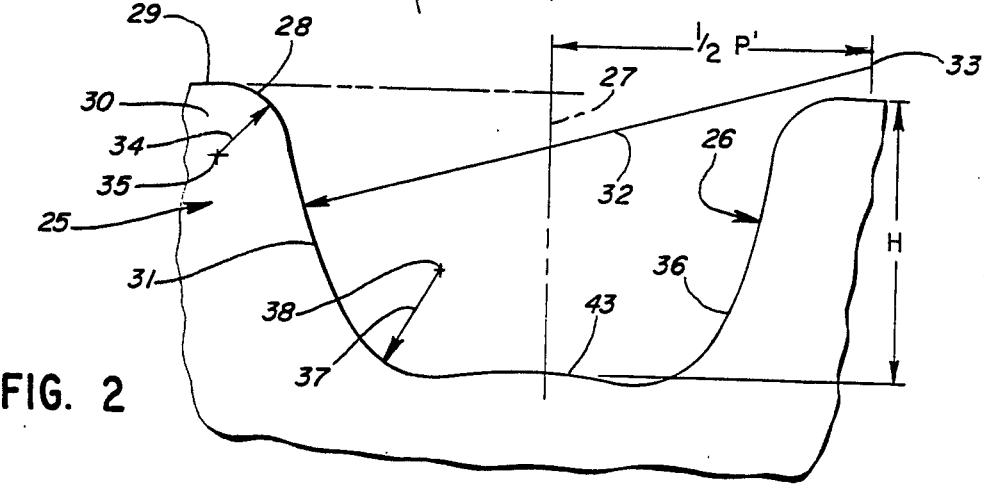
FIG. 2 is a fragmentary side elevation of a pulley embodying the invention.

In the exemplary embodiment of the invention as disclosed in FIGS. 1-3 of the drawing, a toothed power transmission belt generally designated 10 is shown to include a body 11 defining a longitudinal pitch line 12 and an inner land line 13. The body may be provided with a plurality of laterally spaced tensile cords (not shown), in the usual manner.

The belt further includes a plurality of teeth generally designated 14 projecting inwardly from the land line 13. Each tooth defines a centerline 15 and is symmetrical about the centerline.

As shown, each side of the tooth is defined by a convex radially outer root surface 16, a convex inner tip surface 17, and an intermediate power transmission surface 18.

The power transmission surface 18 defines a circular arc having a radius 19 centered at a point 20 spaced from centerline 15 approximately one-half the pitch of the teeth. As shown, radius 19 has a length less than the pitch of the teeth.

Root surface 16 defines a circular arc having a radius 21 centered at a point 22 inwardly of land line 13. The power transmission surface 18 extends inwardly from a junction 23 with the outer end of the root surface to an outer junction 24 with the inner end of the tip surface 17.

As seen in FIG. 1, a line drawn through junctions 23 and 24 intersects the centerline 15 at an angle α. The invention comprehends that the angle α be in the range of approximately 9° to 18° and preferably in the range of 12° to 14°.

Junction 23 is preferably spaced from land line 13 approximately one-fourth the height H of the belt tooth from the land line, or less. Junction 24 is preferably spaced inwardly from the land line approximately two-thirds the height of the belt tooth from the land line, or less. A preferred spacing for the junction 24 is approximately one-half the height of the belt tooth from the land line.

As further shown in FIG. 1, the power transmission surfaces 18 at the opposite sides of the belt tooth define reversely similar arcs having their respective radii centered at points spaced apart a distance W. The spacing W is preferably in the range of approximately 0.95 to 1.05 the pitch of the belt teeth.

The power transmission surface radius 19 preferably has a length in the range of approximately 80% to 85% of the spacing W.

Belt 10 is adapted for cooperative use with an improved pulley 25 shown in FIG. 2. As shown, pulley 25 has a plurality of circumferentially radially outwardly opening grooves 26. Each groove is symmetrical about a radial centerline 27.

As shown in FIG. 2, each half of the groove has a convex outer surface 28 defined by an arc of a circle extending inwardly from a face line 29 defined by the radially outer distal face of the lands, or teeth, 30 between the pulley grooves 26.

The flank surface of the pulley groove further defines a concave sidewall surface 31 extending inwardly from the outer surface 28. Sidewall surface 31 is defined by a circular arc having a radius 32 centered at a point 33 spaced from the centerline of the groove approximately one-half the pitch of the pulley grooves P'. As shown in FIG. 2, the outer surface 28 is defined by a circular arc having a radius 34 centered at a point 35 in the pulley land 30.

The pulley groove further defines an inner surface 36 extending inwardly from the sidewall surface 31 and defining a circular arc having a radius 37 centered on a point 38 in the pulley groove 26.

Belt tooth tip surface 17 defines a circular arc having a radius 39 centered at a point 40 in the belt tooth, as shown in FIG. 1. Preferably, radius 37 of the pulley groove inner surface 36 has a length shorter than the length of radius 39.

Belt tooth 10 defines a distal inner surface 42 inwardly of the tip surfaces 17 and pulley groove 26 further defines a convex radially inner bottom surface 43. The height of the belt tooth from land line 13 to the distal surface 42 is preferably greater than the depth of the pulley groove from face line 29 to the bottom surface 43.

Preferably, radius 21 of the belt tooth surface is longer than the radius 34 of the pulley groove outer surface. Thus, referring to FIG. 3, when the pulley tooth is fully meshed with the pulley groove, a small clearance 44 is had between the belt root surface 16 and pulley outer surface 28, a constant clearance 45 is had between the belt power transmission surface 18 and the pulley sidewall surface 31, and a relatively large clearance 46 is had between the belt tip surface 17 and the pulley groove inner surface 36.

Further as seen in FIG. 3, because the height of the belt tooth is greater than the depth of the pulley groove, an interference occurs at the distal end 42 of the belt tooth, causing the belt tooth to be compressed by the engagement thereof with the convex bottom surface 43 of the pulley groove.

The belt tooth 14 is relatively large and strong for use in transmitting high loads. A large surface area is provided between the power transmission surface 18 of the belt tooth and the sidewall surface 31 of the pulley groove, providing improved power transmission capabilities and prevention of belt jumping.

The provision of the relatively small clearance 44 at the outer end of the groove and the relatively large clearance 46 at the inner end thereof reduces the amount of movement of the belt tooth on start-up and effectively prevents interference between the belt tooth and pulley in the operation of the drive.

Figure 4:
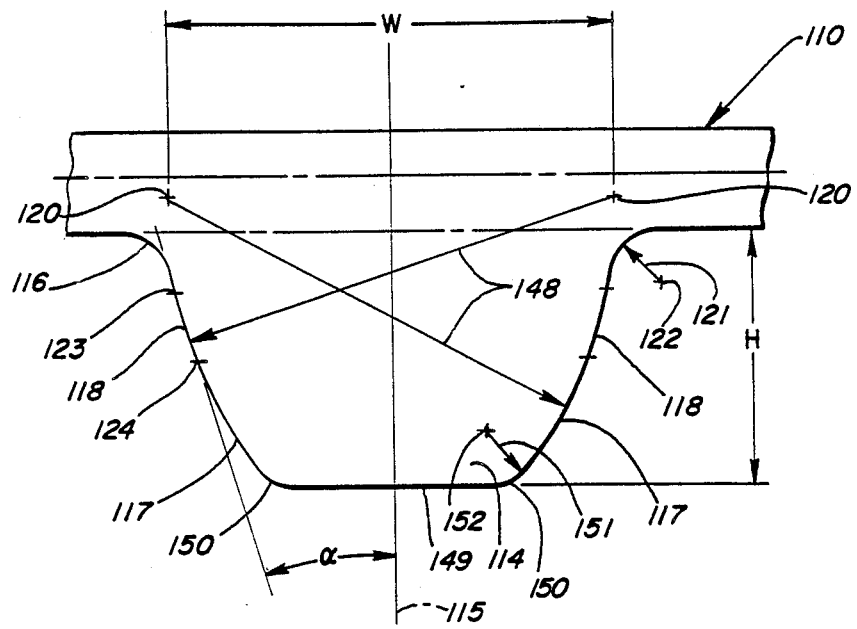
FIG. 4 is a fragmentary side elevation of a modified form of belt embodying the invention.
Figure 5:
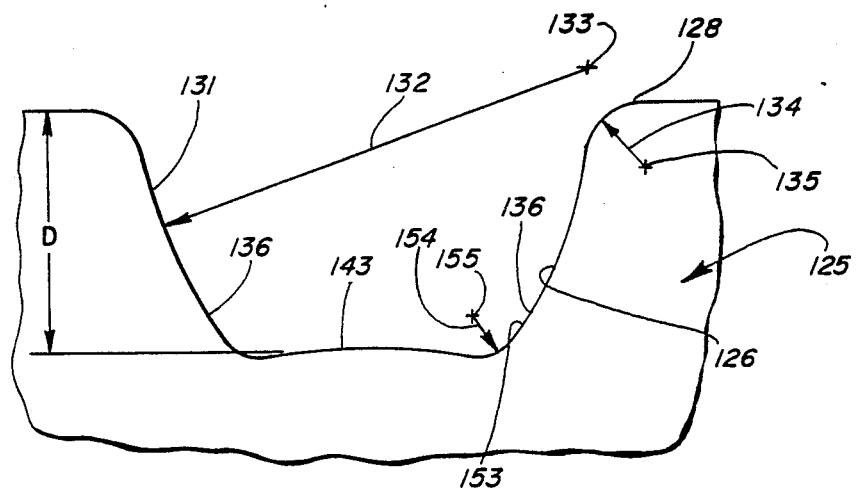
FIG. 5 is a fragmentary side elevation of a modified form of pulley embodying the invention.
Figure 6:
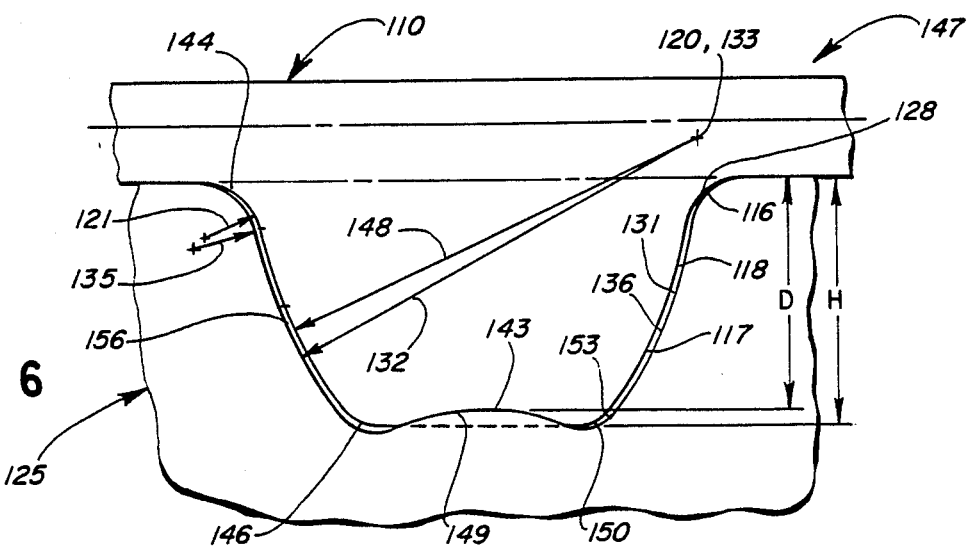
FIG. 6 is a fragmentary side elevation of the modified belt and pulley constructions in meshed association.

Referring now to the embodiment of FIG. 4-6, a modified form of power transmission toothed belt drive generally designated 147 is shown to comprise a drive similar to drive 47 of the embodiment of FIGS. 1-3, but wherein the tip surface 117 of the pulley tooth 114 comprises a continuation of the circular arc defining the power transmission surface 118 thereof. Thus, the power transmission surface 118 and tip surface 117 are defined by a single radius 148 from the point 120 corresponding to point 20 of belt 10.

The junctions 123 and 124 with the root surface 116 and tip surface 117 of power transmission surface 118 are located similarly as junction 23 and 24 in belt 10 and, thus, define a relatively small angle α with the centerline 115 of the belt tooth.

The distal end of the tooth is defined by a flat surface 149 joined to the outer ends of the tip surfaces 117 by rounded corners 150. The rounded corner is defined by an arc having a radius 151 centered on a point 152 in the belt tooth. Radius 151 is relatively small. Thusly, the surfaces 118 and 117 define a continuous circular arc extending substantially the entire height of the belt tooth inwardly from the root surface 116.

In all other respects, belt 110 is similar to belt 10. Elements of belt 110 which are similar to elements of belt 10 are identified by similar reference numerals but 100 higher.

As shown in FIG. 5, drive 147 includes a pulley 125 having a groove 126. Pulley groove 126 is similar to groove 26 of pulley 25 except that the inner surface 136 is defined by the radius 132 centered on point 133 corresponding to radius 32 and point 33 of pulley 25 and further defining the sidewall surface 131 of pulley 125.

Bottom surface 143 is joined to the outer ends of the outer surfaces 136 of the pulley groove 126 by rounded corner surfaces 153. The corner surfaces are defined by a radius 154 centered on a point 155.

As seen in FIG. 6, the clearance 156 between the belt tooth and pulley groove flank surface is constant between the confronting surfaces 131 and 118, and the confronting surfaces 136 and 117. As in drive 47, the clearance 144 between the belt tooth root surface 116 and the pulley groove outer surface 128 is relatively small, and the clearance 146 between the rounded corners 153 of the pulley groove and 150 of the belt tooth is somewhat larger.

The length of the belt tooth is preferably approximately 3% longer than the depth of the pulley groove in the respective embodiments. Such a relationship provides for low noise engagement of the belt with the pulley by minimizing noise of contact at the pulley lands by the belt root surfaces. In each of the embodiments, an improved high load transmission characteristic is provided while yet minimizing interference between the belt and pulley in the operation of the drive. By enlarging the area of engagement between the power transmission surface of the belt tooth and the pulley groove sidewall surface, increased capability of load transmission is obtained while, at the same time, minimizing the belt jumping problem discussed above.

Other than as discussed specifically above, drive 147 functions similarly to drive 47.

The foregoing disclosure of specific embodiments is illustrative of the broad inventive concepts comprehended by the invention.

We claim:

1. A power transmission toothed belt comprising:

a belt body defining a longitudinal pitch line and an inner land line; and a plurality of teeth projecting inwardly from said body, each tooth defining a centerline and being symmetrical about said centerline, each side of the tooth being defined by a convex radially outer root surface, an inner tip surface, and an intermediate power transmission surface, said power transmission surface defining a circular arc having a radius centered at a point spaced from said centerline approximately one-half the pitch of the teeth, and said radius having a length less than the pitch of the teeth.

2. The power transmission toothed belt of claim 1 wherein said power transmission surface extends inwardly from a junction with an outer end of said root surface, said junction being spaced inwardly from said land line approximately one-fourth the height of the belt tooth from said land line or less.

3. The power transmission toothed belt of claim 1 wherein said tip surface extends inwardly from a junction with an outer end of said power transmission surface, said junction being spaced from inwardly said land line approximately two-thirds the height of the belt tooth from said land line or less.

4. The power transmission toothed belt of claim 1 wherein said tip surface extends inwardly from a junction with an outer end of said power transmission surface, said junction being spaced from inwardly said land line approximately two-thirds the height of the belt tooth from said land line.

5. The power transmission toothed belt of claim 1 wherein said tip surface extends inwardly from a junction with an outer end of said power transmission surface, said junction being spaced from inwardly said land line approximately one-half the height of the belt tooth from said land line or less.

6. The power transmission toothed belt of claim 1 wherein said power transmission surface extends inwardly from a first junction with an outer end of said root surface, and said tip surface extends inwardly from a second junction with an outer end of said power transmission surface, a line extending through said first and second junction intersecting said tooth centerline at an angle in the range of approximately 9° to 18°.

7. The power transmission toothed belt of claim 1 wherein said power transmission surface extends inwardly from a first junction with an outer end of said root surface, and said tip surface extends inwardly from a second junction with an outer end of said power transmission surface, a line extending through said first and second junction intersecting said tooth centerline at an angle in the range of approximately 12° to 14°.

8. The power transmission toothed belt of claim 1 wherein said power transmission surface at the opposite side of the belt tooth defines reversely similar circular arcs having their respective radii centered at points spaced apart a distance in the range of approximately 0.95 to 1.05 the pitch of the teeth.

9. The power transmission toothed belt of claim 1 wherein said power transmission surface at the opposite side of the belt tooth defines reversely similar circular arcs having their respective radii centered at points spaced apart a distance in the range of approximately 0.95 to 1.05 the pitch of the teeth, and said power transmission surface arc radius has a length in the range of approximately 80% to of the spacing between said points.

10. A power transmission toothed belt drive comprising:

a belt body defining a longitudinal pitch line and an inner land line;

a plurality of teeth projecting inwardly from said body, each tooth defining a centerline and being symmetrical about said centerline, each side of the tooth being defined by a convex radially outer root surface, an inner tip surface, and an intermediate power transmission surface, said power transmission surface defining a circular arc having a radius centered at a point spaced from said centerline approximately one-half the pitch of the teeth, and said radius having a length less than the pitch of the teeth; and a pulley having a plurality of circumferential radially outwardly opening grooves, each groove being symmetrical about a radial centerline, each half of each groove having a convex outer surface defined by an arc of a circle extending inwardly from a face line defined by the radially outer distal face of a land between successive pulley grooves, a concave sidewall surface extending inwardly from said outer surface and being defined by a circular arc having a radius centered at a point spaced from said centerline approximately one-half the pitch of the grooves, and a concave inner surface.

11. The power transmission toothed belt drive of claim 10 wherein said point at which the sidewall arc radius is centered is coincident with said point at which the power transmitting surface of the belt is centered when the belt tooth is fully meshed with the pulley in the groove.

12. The power transmission toothed belt drive of claim 10 wherein said outer surface of the pulley groove is defined by a circular arc having a radius centered in the pulley.

13. The power transmission toothed belt drive of claim 10 wherein said said belt tooth inner tip surface is defined by an arc of a circle having a radius centered in said tooth and said inner surface of the pulley groove defines a circular arc having a radius centered at a point in the pulley groove, said inner pulley groove surface radius being shorter than said belt tooth tip surface radius.

14. The power transmission toothed belt drive of claim 10 wherein said groove further defines a convex radially inner bottom surface.

15. The power transmission toothed belt drive of claim 10 wherein said belt root surface defines a circular arc having a radius centered at a point inwardly of said land line, and said pulley outer surface defines a circular arc having a radius centered at a point in the pulley, said pulley groove outer surface radius being larger than said belt root surface radius.

16. The power transmission toothed belt drive of claim 10 wherein said belt tooth surfaces and pulley groove surfaces are constructed such that a clearance is provided between the confronting surfaces, the clearance between said pulley groove outer surface and said belt tooth root surface being smaller than the clearance between said pulley groove sidewall surface and said belt tooth power transmission surface, and the clearance between said pulley groove sidewall surface and said belt tooth power transmission surface being smaller than the clearance between said pulley groove inner surface and said belt tooth tip surface.

17. The power transmission toothed belt drive of claim 10 wherein said belt tooth has a height from said land line greater than the depth of the pulley groove from said face line.

18. A power transmission toothed belt comprising:
a belt body defining a longitudinal pitch line and an inner land line;
a plurality of teeth projecting inwardly from said body, each tooth defining a centerline and being symmetrical about said centerline, each side of the tooth being defined by a convex radially outer root surface, an inner tip surface, and an intermediate power transmission surface, said power transmission surface defining a circular arc having a radius centered at a point spaced from said centerline approximately one-half the pitch of the teeth, and said radius having a length less than the pitch of the teeth, said inner tip surface defining a circular arc having a radius centered at said point; and
a rounded surface extending inwardly from said tip surface, said rounded surface having a radius substantially smaller than the radius of said tip surface.

19. The power transmission toothed belt of claim 18 wherein said power transmission surface and tip surface define a continuous circular arc extending inwardly substantially to the distal inner end of the belt tooth.

20. The power transmission toothed belt of claim 18 wherein said power transmission surface extends inwardly from a first junction with an outer end of said root surface, and said tip surface extends inwardly from a second junction with an outer end of said power transmission surface, a line extending through said first and second junction intersecting said tooth centerline at an angle in the range of approximately 10° to 18°.

21. The power transmission toothed belt of claim 18 wherein said power transmission surface extends inwardly from a first junction with an outer end of said root surface, and said tip surface extends inwardly from a second junction with an outer end of said power transmission surface, a line extending through said first and second junction intersecting said tooth centerline at an angle in the range of approximately 12° to 16°.

* * * * *